United States Patent Office 3,072,625
Patented Jan. 8, 1963

3,072,625
POLYAMINE CROSS-LINKED COPOLYMER OF A FLUORINE - SUBSTITUTED NITROSOALKANE AND AN ETHYLENICALLY UNSATURATED HALOGENATED OLEFIN AND PROCESS THEREFOR
Alvin M. Borders, White Bear Lake, Minn., assignor to Minnesota Mining and Manufacturing Company, St. Paul, Minn., a corporation of Delaware
No Drawing. Filed Aug. 7, 1959, Ser. No. 832,157
13 Claims. (Cl. 260—92.1)

This invention relates to a new cross-linking process and products produced thereby. In one aspect, this invention relates to a new cross-linked or vulcanized fluorine-containing polymer. In another aspect, this invention relates to an improved polymer of modified physical and chemical characteristics. In still another aspect, this invention relates to a new vulcanized rubber.

Polymers of various types are known in the art. These polymers vary in physical properties from liquids to elastomeric and rubbery materials. In their form as produced, many of these polymers are undesirable since they do not have sufficient strength, rigidity and durability for the intended use. In order to achieve the desired properties of the polymers, many of the polymers have been cross-linked or vulcanized to produce a form of solid polymer having the desired characteristics.

The nature of the cross-linking agent will vary with the nature of the chain polymer and with the nature of the cross-link desired. There are a number of reactions which may result in the cross-linking of a chain polymer. In some reactions the cross-linking agent will take part so that at least a portion of it forms the cross-link and appears in the final cross-linked molecule. In other reactions the cross-linking agent acts solely as an activator and does not appear in the final molecule.

The chemistry of cross-linking is imperfectly understood. Cross-linking agents successful with one type of chain polymer are often ineffective with another type. There appears to be no rule for predicting with accuracy whether or not a particular cross-linking agent effective with one type of chain polymer will be effective with another type. In the case of fluorine-containing polymers, the theory of cross-linking such polymers was based on the presence of hydrogen in the polymer chain. This hydrogen must be present in the polymer as a site for cross-linking. It has, therefore, been considered substantially impossible to vulcanize or cross-link perhalogenated polymers, particularly the perfluorinated chain polymers.

The object of this invention is to produce a vulcanized highly fluorinated polymer.

It is another object of this invention to provide a process for vulcanizing fluorine-containing polymers.

It is another object of this invention to convert linear elastomers containing fluorine, nitrogen and oxygen into vulcanizates of increased strength and superior extensibility.

Still a further object of this invention is to provide a new coating material and method for applying such coating to various objects and surfaces.

Another object of this invention is to provide a low molecular weight heat stable polymer in fluid form which can be utilized under moderate conditions as a fluid to coat surfaces and then cross-linked or vulcanized to impart the desired rigidity and strength to the coating or surface.

Various other objects and advantages of the present invention will become apparent to those skilled in the art without departing from the scope of this invention.

According to this invention, a fluorine-containing nitrosoalkane is copolymerized with an ethylenically unsaturated halogenated olefin to produce a linear copolymer, which varies in physical form from normally liquid to normally solid high molecular weight material and subsequently cross-linking or vulcanizing the copolymer thus produced to modify the physical and chemical characteristics of the polymer. The linear copolymers vulcanizable in accordance with this invention have an average molecular weight between about 5,000 and about 150,000 or 200,000 or higher. The solid copolymers have molecular weights usually above 50,000 and are usually elastomeric or rubbery in form. The solid polymers are insoluble in hydrocarbon solvents but are completely soluble in fluorinated hydrocarbons. The proportion of monomeric units in the final uncross-linked polymer may vary to some extent; usually, however, the copolymer in either the liquid or solid form is a 1:1 copolymer. These polymers are vulcanizable under moderate conditions at temperatures from about 20° C. to about 250° C., depending upon the vulcanization agent and the polymer to be vulcanized. The vulcanization agent used to convert the liquid to a solid copolymer or the elastomer to a more rigid copolymer of increased tensile strength are the alkylene and arylene polyamines. The weight proportion of polyamine cross-linking agent to copolymer is usually between about 0.01 and about 10 to 100, preferably between about 0.1 and about 1 to 100.

The fluorine-containing nitrosoalkane monomeric material of the present invention is perhalogenated in which the halogens are normally gaseous halogens and preferably the nitrosoalkane contains less than 13 carbon atoms per molecule and is a mononitrosoalkane. Nitrosoalkanes of greater number of carbon atoms can be made and used as monomers without departing from the scope of this invention. Typical examples of the fluorine-containing mononitrosoalkanes of the present invention include trifluoronitrosomethane, pentafluoronitrosoethane, heptafluoronitrosopropane, nitrosoperfluorobutane, nitrosoperfluorooctane, trifluorodichloronitrosoethane, 1-nitroso-1,3,5,7,7,7-hexachlorononafluoroheptane, and 1-nitroso-1,3,5,7,9,9,9-heptachlorododecafluorononane.

The mononitrosoalkanes are prepared by reacting a fluorine-containing alkyl halide of less than 13 carbon atoms, such as an alkyl bromide or an alkyl iodide, with nitric oxide in approximately equal molar ratios in the presence of mercury and ultraviolet light for about 24 hours to produce the corresponding nitrosoalkane. The use of the alkyl bromide for this reaction is unexpected because the bromine-carbon bond is more stable and stronger than the iodine-carbon bond. The use of the bromide is very desirable because it is much cheaper than the iodide. For example, trifluoromethylbromide is reacted with nitric oxide to produce trifluoronitrosomethane; pentafluoroethylbromide is reacted with nitric oxide to produce pentafluoronitrosoethane; and heptafluoropropylbromide or iodide is reacted with nitric oxide to produce heptafluoronitrosopropane. Also, the chlorofluoronitrosoalkanes can be prepared from chlorotrifluoroethylene telomers of trichlorobromomethane in a similar manner.

A convenient empirical formula for representing the mononitroso compounds is R—NO where R is a perhalogenated alkyl radical containing fluorine on the carbon atom adjacent to the nitroso group, in which the other halogens are selected from the group consisting of chlorine and fluorine. Preferably, the alkyl radical has not more than six carbon atoms.

The comonomers with which the fluorine-containing nitrosoalkane of this invention may be copolymerized are the polymerizable monoolefins having ethylenic unsaturation and not more than eight carbon atoms per molecule. Preferably, the monoolefins are perhalogenated ethylenes and preferably have at least two fluorine atoms per molecule. Examples of the fluorine-containing monoolefin comonomers include difluorodichloroethylene, tetrafluoroethylene and trifluorochloroethylene.

Since the copolymerization reaction proceeds by the free-radical mechanism, various polymerization techniques may be utilized to copolymerize the monomers of the present invention to produce the copolymer product. Accordingly, the polymerization may be carried out as a bulk polymerization in which the monomers are polymerized in a bomb under autogeneous pressure at temperatures below 10° C., preferably below 0° C. for a period of time of at least one-half hour to obtain 90 percent conversion to the solid polymer. Temperatures much above 25° C. in the bulk system result in lower molecular weight waxy or oily product. The charge should utilize an excess of the nitroso monomer, and preferably at least a 2:1 mol excess of the nitroso monomer when producing the solid copolymer.

It has also been found that polymer can be produced by the use of the aqueous emulsion technique in which the monomers are emulsified in an aqueous medium during polymerization. This technique may be carried out at substantially higher temperatures than the bulk system, and temperatures above 0° C. and as high as 50° C. may be employed and still result in the production of high molecular weight solid polymers. The use of an emulsifier and temperature increases the rate of reaction but does not result in lower molecular weight material. In the emulsion technique, the monomers may be charged in a 1:1 mol ratio or higher. Preferably, an excess of nitroso monomer is employed, such as a mol ratio of nitrosoalkane to comonomer of 2:1 or higher. It is important, however, in the emulsion technique that the emulsifier is substantially inert and does not act as a chain transfer agent when it is desired to produce solid polymer. Many emulsifiers tend to cause production of low molecular weight material rather than the solid polymer either because they fail to sufficiently emulsify the mixture or act as chain transfer agents stopping the chain growth. It has been found that the perhalogenated alkanoic acids and salts thereof are particularly good emulsifying agents. For example, the perfluorochloro and the perfluoroalkanoic acids having between about 6 and about 12 carbon atoms per molecule are suitable either in the acid form or in the alkali metal or ammonium salt form. A particularly suitable emulsifier is perfluorooctanoic acid or the patassium salt thereof.

If production of liquids is desired, higher temperatures up to about 150° C. and chain transfer agents, such as carbon tetrachloride, trifluoromethyliodide, trifluoromethylbromide, and chloroform, are usually used.

It is essential in the present system to provide pure and clean monomer if it is intended to produce solid high molecular weight linear copolymers. The monomers themselves are made from materials which act as free radical promoters; for example, trifluoromethyliodide and trifluoromethylbromide. These latter compounds are noted as very active free radical chain transfer agents. Therefore, only by special care in purifying the monomers derived from these precursor materials is it possible to produce the high molecular weight polymer having an essentially linear structure. When it is desired to produce solid polymer, the monomers should contain less than 1 weight percent of any impurities, such as trifluoromethylbromide, and preferably less than 0.5 weight percent impurities, particularly when the impurity may be trifluoromethyliodide. If the impurity content of the monomers exceeds the above values, the copolymer molecular weight is substantially below 50,000, usually around 7,000 to 15,000 molecular weight.

In order to obtain such a purified monomer of the nitrosoalkane, a packed distillation column of about 70 theoretical plates or more should be used. For example, the use of a distillation column of 50 or less theoretical plates and of ineffiecient construction results in an impurity content as high as 20 weight percent.

The copolymer of the present invention may be represented by the following typical linear-type structure which has been substantiated by chemical analysis and nuclear magnetic resonance determination. The structure for the 1:1 copolymer using the mononitroso monomer is represented by the following:

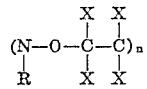

in which X is a halogen, and preferably X is fluorine or chlorine; and R is a perhalogenated fluorine-containing alkyl radical; and $n$ is generally 10 to 1,000.

There is no evidence in the high molecular weight copolymer structure of cross-linking between copolymer chains by either of the monomers or monomer fragments. It is to be understood that the pendant alkyl groups of the monomeric units of the copolymer do not constitute chain branches. There is no evidence that the high molecular weight properties result from a mixture of copolymer and homopolymer. The character and structure of the present high molecular weight composition have been substantiated by solubility, N.M.R. spectra, and elemental analysis. By the method of this invention, these rubber copolymers may be transformed into vulcanizates of increased strength and toughness, of decreased solubility.

The polyfunctional amino compounds which are used as linking agents in accordance with the present invention are those containing at least two amino groups which are primary or secondary. The amino groups are preferably linked to an open chain organic radical, such as an alkylene radical. Primary diamines are also preferred. The alkylene polyamines which may be used as cross-linking agents in accordance with this invention include the aliphatic alkylene polyamines and the dialkylene arylene polyamines, such as ethylene diamine, diethylene triamine, triethylene tetramine, tetraethylene pentamine and hexamethylene diamine and meta-xylylene diamine. Examples of suitable arylene diamine cross-linking agents include benzidine and p,p'-diaminodiphenylmethane. The arylene diamines require somewhat more severe conditions of temperature and time for cross-linking. Compounds which yield alkylene polyamines by dissociation or decomposition or by reaction with other materials under the conditions of molding or vulcanization are also useful as cross-linking agents in this invention. The carbamic radical containing salts of acyclic primary and secondary polyamines are among the compounds of this class because upon heating under the conditions of vulcanization the alkylene polyamines are produced. Examples are the carbamic radical salts of hexamethylene diamine, triethylenetetramine, triethylenetriamine, etc. These carbamic compounds are produced by reacting an alkylene polyamine with carbon dioxide under anhydrous conditions at a temperature between about 20 and about 100° C. Other compounds similarly capable of producing the polyamine under the conditions of vulcanization include the polyisocyanates, such as hexamethylene diisocyanate, the polyamine salts, such as hexamethylene diamine carbonate and hexamethylene diamine diacetate, the polyureas, such as hexamethylenediurea, the polycarbamyl halides, such as hexamethylene dicarbamyl chloride, and the polyurethanes, such as hexamethylenediurethane. Such compounds as cyclohexylamine, dicyclohexylamine, tetramethyl-quanidine and tris-aziridyl phosphine oxide will not cross-link or vulcanize the nitrosoalkane copolymer. The cross-linking of the polymer with the alkylene polyamines is accomplished without substantial discoloration or increase in the opacity or refractive index of the copolymer. The cross-linked material is of substantial increased strength and hardness and is substantially insoluble in any solvents.

While it is not desired to be bound by any particular theory of operation, it is believed that hydrogen-containing amino groups are effective as linking agents with the aforesaid halogen-containing chain polymers in that the hydrogen of the amino group and a halogen bonded to a carbon atom of the polymer chain unexpectedly combine to condense out a hydrogen halide molecule and thereby permit the nitrogen of the amino group to be bonded directly to the carbon atom from which the halogen has been removed. With a polyamine, more than one such linkage takes place on the molecule of the linking agent and thereby links one polymer chain to another.

Since hydrogen halide may be evolved in the reaction, the linking proceeds probably more favorably when hydrogen halide is removed. To some extent, and particularly when cross-linking thin polymer sections, the hydrogen halide may be volatilized off at the temperatures used in the cross-linking reaction. However, it may be desirable to neutralize any hydrogen halide by the addition of excess amine, which acts as a base, or by the addition of an inorganic basic compound, such as lead oxide, calcium oxide, magnesium oxide or zinc oxide.

The cross-linking reaction may require or may produce materials which would have an adverse effect on the properties of the cross-linked polymer. For example, the metallic halides produced by the reaction of inorganic basic compounds with hydrogen halide might reduce the chemical inertness and electrical resistance of the polymer. However, since relatively few cross-linkages are required to produce a substantial alteration in the characteristics of the polymer, relatively small amounts of linking agents and associated reagents are required. In producing a cross-linked polymer for special processes where a high degree of chemical inertness or electrical resistance is required, conditions may be controlled so that a minimum of undesired material remains in the polymer.

There are several methods of reacting the chain polymers with the alklene polyamine cross-linking agents, depending on the character of the chain polymer and upon the use intended for the cross-linked polymer. When the polymer has rubbery characteristics or when it is soft enough to be mechanically worked, either with or without plasticizers, it is often desirable to incorporate the cross-linking agent by mechanical mixing. Such mechanical mixing involves shearing forces and is carried out in equipment such as 2-roll mills, Banbury (internal) mixers and screw-type plasticators, similar to extruders. Somewhat elevated temperatures of the order of from about 50° to about 100° C. ordinarily prevail in the mixing operation due to the mixing action itself and to the exothermic nature of the linking reaction. Articles to be molded are subsequently heated in the mold with additional heat, as by hot air, steam or hot press platents, thereby shaping and cross-linking simultaneous. The temperature in the mold may range from about 100° to about 250° C.

Since mechanical mixing generates heat and since it is difficult to blend other materials into a cross-linked polymer, it is usually desirable to blend other materials into the polymer first and then add the linking agent last, just before fabrication. Among the other materials which might be added to the aforesaid polymers prior to cross-linking are fillers, such as carbon black, pigments and plasticizers.

With certain polymers and for certain uses, particularly for coatings, polymers may be cross-linked after being deposited from solution. The polymer and linking agent are dissolved in a suitable solvent, such as a fluorocarbon, the solution is applied to a surface, such as a fabric or a metal, and then the coating is dried and heated to cross-link the polymer. In most cases, the coating is strongly adherent but in other cases it may be stripped off to form a self-supporting film of cross-linked polymer.

Still another method of cross-linking the nitroso polymer involves the use of an emulsion or "latex." As stated above, the copolymerization product may be prepared in a water suspension type system. In such a system the product is removed from the reactors as a latex. For most purposes, the dry rubbery copolymer is recovered by coagulation of the latex with salts and acids followed by washing and drying. But for other purposes, such as dip coating and spraying, the latex can be used directly. In these cases, the other ingredients (fillers, polyamine cross-linking agents, etc.) are dispersed in water containing a surface-active agent, and these dispersions are blended with the latex. The latex is then applied as a coating to a surface and the polymer is cross-linked as the latex is dried and heated.

Still another method of reacting the chain polymer with a polyamine cross-linking agent involves the reaction of the polyamine with the polymer in its finished, fabricated state. Since this method involves penetration of the polymer by the reactant polyamine, it is adaptable primarily to very thin sections of polymer such as in coatings or in self-supporting films. The coating or film is maintained in contact with the polyamine cross-linking agent, at elevated temperatures and preferably under pressure, for a period of time ranging from a few seconds to several days. This results in the changing of the characteristics of the chain polymer to those of a space or three dimensional polymer.

In the usual vulcanization procedure for liquid copolymers, the vulcanization recipe is admixed with the liquid or waxy polymer to be culcanized just prior to placing the polymer upon the surface or in the configuration and the admixture let stand at a moderate or an elevated temperature until vulcanization sets in. This is particularly a desirable technique to use when the polymer is liquid or a grease. In the case of greases, some heating of the polymer may be necessary in order to permit the polymer to flow onto the surface or in the contour of the configuration. In the case of waxes and also with the greases, a solvent may be used so that the polymer may be placed upon the surface or in the desired configuration in a fluid condition. Just prior to applying the polymer solution, the vulcanization recipe ingredients are added. The vulcanization ingredients may also be added to the solution after application. Suitable solvents include the Freons or other fluorocarbons.

The vulcanized high molecular weight copolymers of the present invention are useful as sealants, adhesives and surface coatings, such as for metal, plastic and glass surfaces. The metal surfaces include aluminum, copper, brass, steel, etc. The plastic surfaces include films of polyvinyl chloride, polyethylene, polyvinyl fluoride, etc. The solid polymers may be preformed into various articles, such as gaskets and O-rings, and vulcanized during preforming or in a separate step thereafter.

The following examples are offered as a better understanding of the various aspects of this invention and should not be construed as limiting the invention.

EXAMPLE I

A 50/50 mol ratio charge of $CF_3Br$ (74.5 grams) and NO (15.0 grams) were agitated in the presence of mercury and ultraviolet light (2537 A.) for 24 hours. The pressure was maintained at about one atmosphere by intermittently charging NO as the pressure decreased. The product was distilled in a 35 inch long reflux column having 70 theoretical plates using aluminum turnings as packings and at a reflux temperature of about $-84°$ C. to produce a 60 percent yield of trifluoronitrosomethane substantially free from $CF_3Br$ (less than 1 weight percent).

EXAMPLE II 5 grams of $CF_3NO$ (made and purified as above) and 2.5 grams of $C_2F_4$ were charged to a 30 ml. Pyrex ampoule and agitated therein in the absence of a catalyst for 24 hours at −16° C. A 95–98% conversion was obtained based upon the C₂F₄ charged. The product was a rubbery high molecular weight polymer having an inherent viscosity of 0.45 corresponding to an average molecular weight of about 80,000 to 100,000. The polymer in the glass reactor was dissolved in $CF_2ClCFCl_2$ and removed from the reactor in solution (no insoluble residue).

Similar polymerizations as above at −40 and −65° C. yielded approximately identical products.

The copolymer product of the above run had the following physical and chemical properties.

$CF_3NO/C_2F_4$ gum—properties:
  $\langle n \rangle$ inherent viscosity 0.45 gum rubber Analysis (C, F, N)—indicates 1:1 comonomer ratio
Infrared—shows disappearance of N=O bond
N.M.R.—linear structure

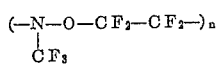

$T_g$ (by $n^d$)——51° C.
24 hours' swell, A.S.T.M. fluid II—2.1% (gum)
Soluble—all fluorocarbons
Insoluble—common organic solvents (non-halogenated)
Thermally stable to 200° C.

EXAMPLE III

To a 1.0 gram solution of $CF_3NO/C_2F_4$ copolymer of Example II dissolved in the perfluorocyclic ether ($C_8F_{16}O$) (20 percent solids) was added a saturated solution of hexamethylene diamine in the cyclic ether ($C_8F_{16}O$) (0.05 percent solids). The weight ratio of diamine to polymer in the resulting mix was 0.25:100. When this mixture was stirred, a gel resulted that was no longer soluble in the above perfluorocyclic ether but was only swelled by it.

EXAMPLE IV

A portion of the $CF_3NO/C_2F_4$ copolymer of Example II at 20 percent solids in perfluorocyclic ether ($C_8F_{16}O$) was placed on a piece of polyvinyl fluoride plastic film. This was spread to an eight mil (.008 inch) wet thickness by means of a coating bar and allowed to dry. A saturated solution of hexamethylene diamine in the cyclic ether ($C_8F_{16}O$) (0.05 percent solids) was allowed to flow over this film, completely wetting it. Upon air drying, the copolymer coating was tack-free having good adhesion to the substrate film. The diamine treated spread of $CF_3NO/C_2F_4$ copolymer had rubbery characteristics, such as snap and recovery, which the original copolymer did not exhibit. It was also essentially insoluble in the above cyclic ether. The copolymer was cross-linked at room temperature.

EXAMPLE V

The copolymer of Example II was compounded and vulcanized in several runs with different vulcanization recipes as shown in Table 1 below. The physical results on the best cures are shown in more detail in Table 2 below. In Table 2, run No. J–1 is the same as run No. J except that the cure was oven treated at 300° F. for an additional 43 hours.

*Table 1*

CURING RECIPES

| Run | A | B | C | D | E | F | G | H | I | J |
|---|---|---|---|---|---|---|---|---|---|---|
| Recipe | Quantities expressed in parts by weight | | | | | | | | | |
| CF₃NO/C₂F₄ Copolymer | 100 | 100 | 100 | 100 | 100 | 100 | 100 | 100 | 100 | 100 |
| Hexamethylene Diamine | 4 | 3 | 3 |  |  | 2 |  |  |  |  |
| Hexamethylene Diamine Carbamate |  |  |  | 4 | 6 |  |  | 3 |  |  |
| Triethylene Tetramine |  |  |  |  |  |  | 1.25 |  | 1.5 | 1.5 |
| CaO |  |  |  |  |  |  |  | 6 |  |  |
| MgO |  |  |  | 20 | 20 |  | 20 |  |  |  |
| Carbon Black |  | 15 |  | 15 | 15 | 20 | 20 |  | 25 | 25 |

EXPERIMENTED CURING CYCLES

| Temperature ° F. | Time, hours | | | | | | | | | |
|---|---|---|---|---|---|---|---|---|---|---|
| Mold in press: | | | | | | | | | | |
| at 300° F | ½ | ½ | ½ | ½ | ½ | ½ | ½ |  | ½ | ½ |
| at 250° F |  |  |  |  |  |  |  |  |  | 10 |
| Sample in Oven: | | | | | | | | | | |
| at 140° F |  |  |  |  |  |  |  |  | 1 | 72 |
| at 180° F |  |  |  |  |  |  |  | 1 |  |  |
| at 212° F |  |  |  | 1 |  |  |  |  |  |  |
| at 250° F |  |  |  |  |  |  | 16 |  |  | 7 |
| at 300° F |  |  |  | 1 |  |  |  |  |  |  |
| at 400° F |  |  |  | 1 |  |  |  |  |  |  |
| Obtained Cure | Fair | Fair | Fair | Fair | Fair | Fair | Good | Fair | Fair | Good |

*Table 2*

| Run | J | J–1 |
|---|---|---|
| Ingredients: | | |
| C₂F₄/ONCF₃, parts by wt | 100 | 100 |
| Triethylene tetramine, parts by wt | 1.5 | 1.5 |
| Carbon Black, parts by wt | 25 | 25 |
| Curing Cycle: | | |
| Mold in press— | | |
| at 300° F., hr | ½ | ½ |
| at 250° F., hr | 10 | 10 |
| Post cure in Oven— | | |
| at 250° F., hr | 7 | 7 |
| at 300° F., hr |  | 43 |
| Properties: | | |
| Tensile Strength at break, p.s.i | 49.3 | 184 |
| Tensile at 100% Elong., p.s.i | 23.7 | 99 |
| Elongation, percent | 425 | 150 |
| Gehman T₁₀, ° C | −37 |  |
| Brittle Point, ° C | −37 |  |
| Tortional T₁₀ modulus, p.s.i | 7.74 |  |
| Volume Swell, at room temp.: | | |
| in 70:30 (Iso. Oct. Toluene), percent | 0 | 0 |
| in Acetone, percent | 0 | 0 |
| in Heptane, percent | 0 | 0 |
| in Toluene, percent | 0 | 0 |
| in Carbon Tetrachloride, percent | 0 | 0 |

EXAMPLE VI

Approximately 0.01 gram of benzidine was added to one gram of the copolymer of $CF_3NO$ and $CF_2CF_2$ and thoroughly mixed. The mixture was heated for five hours at 125° C. The cross-linked copolymer was only partially soluble in fluorocarbon solvent and exhibited increased strength on stretching.

In addition to the above vulcanizations, attempts were made to vulcanize the copolymers of Example II, cyclohexylamine, dicyclohexylamine, tetramethylquanidine and tris-aziridyl phosphine oxide, potassium hydroxide, and calcium oxide without success.

In the above recipes, carbon black is a filler to impart body and abrasive resistance to the ultimate vulcanized product, and whether or not carbon black constitutes a part of the vulcanization recipe will depend upon the ultimate use of the vulcanized product. In addition to the physical properties of the vulcanized product, another indication of cure is insolubility of the treated polymer in a fluorocarbon solvent such as the cyclic ether, $C_8F_{16}O$. All of the vulcanized polymers were insoluble in a fluorocarbon solvent; whereas, those polymers that were treated and did not vulcanize continued to be soluble in fluorocarbon solvents.

Various modifications and alterations of the physical properties of the vulcanized product are possible with different vulcanization recipes. In addition, minor alterations in the use of fillers and pigments and proportions of the ingredients of the vulcanization recipe may be practiced without departing from the scope of this invention.

Having described my invention, I claim:

1. A perfluorocarbon solvent-soluble solid linear copolymer having a molecular weight of at least 50,000 of a fluorine-substituted nitrosoalkane having less than 13 carbon atoms per molecule and an ethylenically unsaturated halogenated monoolefin, the halogens of said olefin being normally gaseous halogens, cross-linked with a polyamine containing at least one hydrogen atom on the amino nitrogens.

2. A perfluorocarbon solvent-soluble solid linear copolymer having a molecular weight of at least 50,000 of a perhalogenated nitrosoalkane containing fluorine substitution and having less than 13 carbon atoms per molecule and an ethylenically unsaturated perhalogenated monoolefin containing fluorine substitution, the halogens of said nitrosoalkane and said olefin being normally gaseous halogens cross-linked with a polyamine containing at least one hydrogen atom on the amino nitrogens.

3. The cross-linked copolymer of claim 1 in which said polyamine is an alkylene polyamine.

4. The cross-linked copolymer of claim 1 in which said polyamine is an arylene polyamine.

5. The cross-linked copolymer of claim 1 in which said nitrosoalkane is trifluoronitrosomethane and said olefin is tetrafluoroethylene.

6. The cross-linked copolymer of claim 1 coated on a solid surface.

7. A process for cross-linking which comprises cross-linking a perfluorocarbon solvent-soluble solid linear copolymer having a molecular weight of at least 50,000 of a fluorine-substituted nitrosoalkane having less than 13 carbon atoms per molecule and an ethylenically unsaturated halogenated monoolefin, the halogens of said olefin being normally gaseous halogens, with a polyamine containing at least one hydrogen atom on the amino nitrogens at a temperature between about 20° and about 250° C.

8. A process for cross-linking which comprises cross-linking a perfluorocarbon solvent-soluble solid linear copolymer having a molecular weight of at least 50,000 of a perfluorinated nitrosoalkane having less than 13 carbon atoms per molecule and an ethylenically unsaturated perfluorinated monoolefin with a polyamine containing at least one hydrogen atom on the amino nitrogens at a temperature between about 20° and about 250° C.

9. The process of claim 8 in which said polyamine in diethylene triamine.

10. The process of claim 8 in which said polyamine is triethylene tetramine.

11. The process of claim 8 in which said polyamine is hexamethylene diamine.

12. The process of claim 8 in which said polyamine is meta-xylylene diamine.

13. The process of claim 8 in which said polyamine is benzidine.

References Cited in the file of this patent

UNITED STATES PATENTS 2,793,200    West    May 21, 1957

FOREIGN PATENTS 1,159,935    France    Feb. 17, 1958

OTHER REFERENCES

Barr et al.: Journal of The Chemical Society 1881–1889 (1955).

Chem. Eng. News 37 (No. 31), August 3, 1959, page 40.

Barr et al.: Nature, pages 990–91, vol. 175 (1955).

Dixon et al.: Ind. and Eng. Chem., pages 1687–90, vol. 49 (1957).

Moran et al.: Ind. and Eng. Research, pages 831–32, vol. 51 (July 1959).